Feb. 3, 1931.                C. ST.J. SPRIGG                1,791,386
              VARIABLE SPEED GEAR OR TORQUE CONVERTER
                    Filed Feb. 7, 1930      2 Sheets-Sheet 1
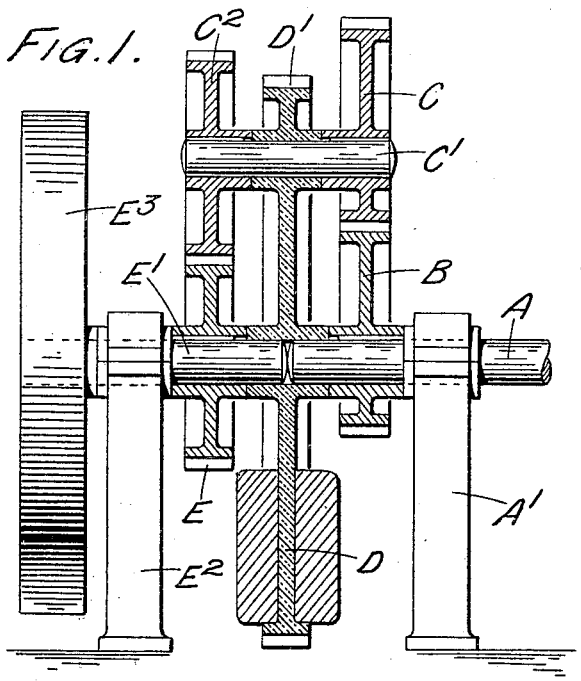
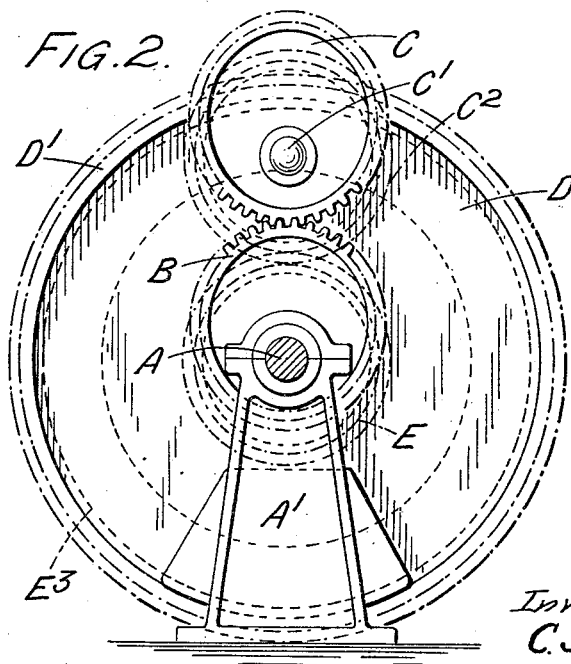
Inventor,
C. St. J. Sprigg Feb. 3, 1931.   C. ST.J. SPRIGG   1,791,386
VARIABLE SPEED GEAR OR TORQUE CONVERTER
Filed Feb. 7, 1930   2 Sheets-Sheet 2
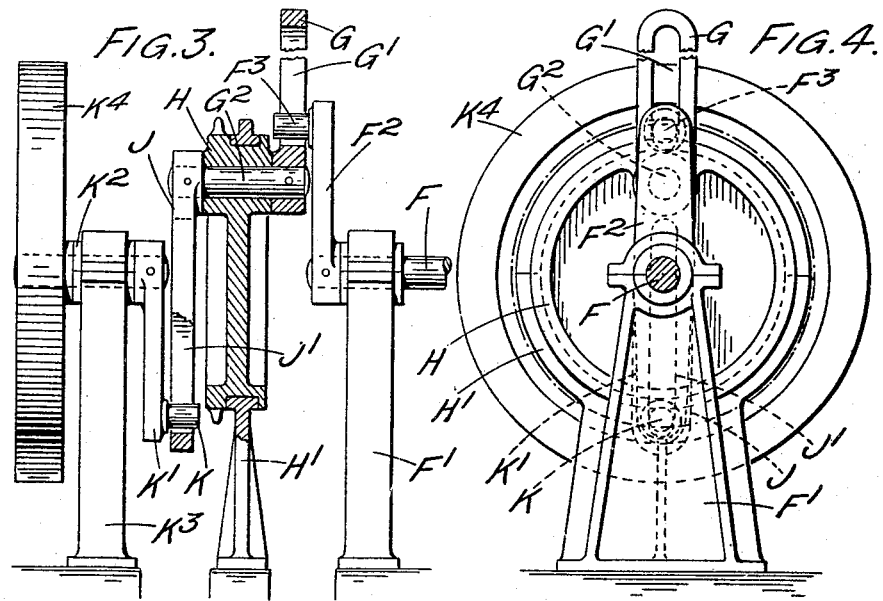
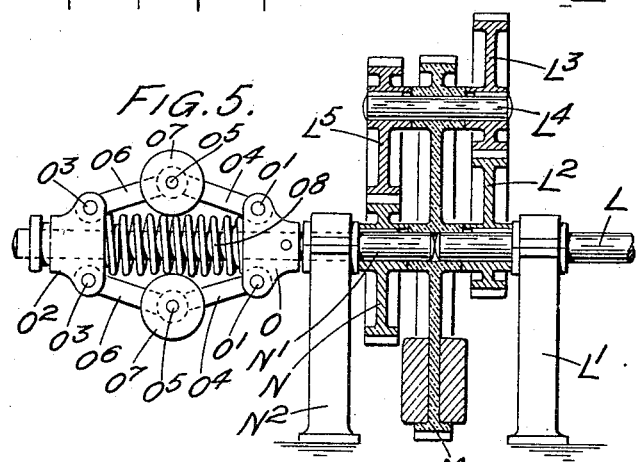
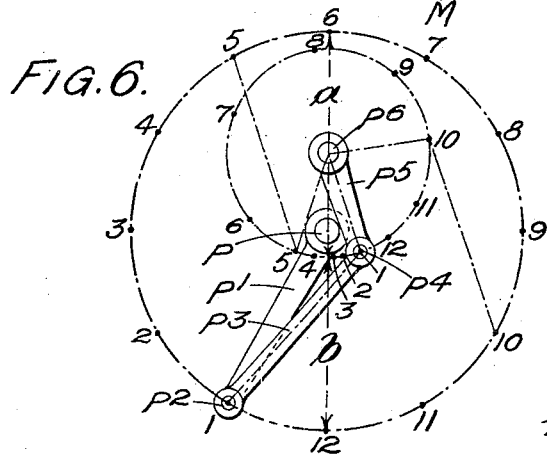
Inventor,
C. St. J. Sprigg Patented Feb. 3, 1931

1,791,386

UNITED STATES PATENT OFFICE

CHRISTOPHER ST. JOHN SPRIGG, OF LONDON, ENGLAND

VARIABLE-SPEED GEAR OR TORQUE CONVERTER

Application filed February 7, 1930, Serial No. 426,660, and in Great Britain February 19, 1929.

This invention relates to variable speed gears or torque converters of the kind comprising driving and driven shafts or like members and an energy storing device in the form of an inertia member or mass which alternately absorbs energy from the driving member and gives such energy out either to the driving or to the driven member or partly to each of these members. In previously proposed variable speed gears of the above type it has been necessary to provide at least one free wheel or like unidirectional driving device through which power was transmitted and difficulty has been experienced in providing a free wheel device which would operate satisfactorily for a sufficient period under running conditions.

The object of the present invention is to provide a variable speed gear or torque converter of the general type above referred to in which a unidirectional drive can be transmitted without the use of free wheel or like devices.

A variable speed gear or torque converter according to the present invention comprises in combination with coaxial driving and driven shafts or like members a third member (hereinafter termed the mass member) carrying or operatively connected to a mass and mounted to rotate coaxially with the driving and driven members, a shaft, hereinafter termed an intermediate shaft, freely carried by the driven member and rotatable about an axis out of line with the common axis of the driving and driven members, and operative connections between the intermediate shaft and the driving member and between the intermediate shaft and the mass member such that, with the driven member stationary and the driving member rotated at a constant speed, the mass member will rotate always in the same sense as the driving member but at a varying speed, the torque produced on the driven member varying but being always in the same sense.

Thus the arrangement is such that with the driving member rotating at constant speed, the greater the difference between the speeds of the driving and driven members at any moment during either the acceleration or the deceleration of the mass member, the greater the rate of acceleration or deceleration of the mass member and the greater the torque produced on the mass member due to the inertia of the mass, there being no acceleration or deceleration of the mass, and hence no torque on the mass member when the driven member rotates at the same speed and in the same sense as the driving member. Thus during the normal driving condition in which the driven member is rotating in the same sense as, but slower than the driving member, an increasing speed of the driven member so that this speed approaches more nearly to the speed of the driving member will, during either the accelerating or decelerating phase of the mass member, produce a decrease in the torque on the mass member by decreasing the magnitude of the acceleration or the deceleration. Similarly during the normal driving condition a decreasing speed of the driven member so as to increase the difference in speed between the driving and driven members produces during either the accelerating or decelerating phase of the mass member an increase in the magnitude of such acceleration or deceleration and hence of the torque on the mass member.

The form of the operative connections between the intermediate shaft and the driving and mass members to produce the desired effect may vary but one at least of these operative connections must be of a type, hereinafter termed the varying ratio type, which will yield a constantly varying gear ratio between the members which it connects. Thus in one convenient arrangement the operative connection between the driving member or the mass member and the intermediate shaft or each of these connections is in the form of gearing comprising an elliptical gear wheel mounted on one of the members to be connected with the axis of rotation of such member passing through one of the foci of the ellipse, such gear wheel meshing with a similar elliptical gear wheel similarly mounted on the other member.

Alternatively, one or each of these operative connections may comprise a crank or the like on the intermediate shaft having a crank pin which engages but is capable of sliding radially relatively to an arm or the like on the driving or mass member. With such an operative connection the dimensions and arrangement of the parts are such that with the driven member stationary and the driving member rotating the crank pin will slide freely in the slot in the arm and describe a circle eccentric to and enclosing the axis of the shaft carrying this arm.

In yet another arrangement one or each of these operative connections may comprise a link connected at its ends respectively to the intermediate shaft and the mass member or driving member by crank pins each of which lies at a greater distance from the axis of rotation of the member to which it is connected than the distance between the axes of the driving member and intermediate shaft. In a still further arrangement, one or each of these operative connections may comprise eccentrically mounted pulleys, sprockets or the like on the two members to be connected and a chain, belt or like flexible transmission member connecting the pulleys and sprockets. If desired, one of the forms of varying ratio operative connection indicated above may be employed to connect the intermediate shaft to the driving member and another of these operative connections be used to connect the intermediate shaft to the mass member.

In any case an operative connection of the type indicated above may be employed for connecting the intermediate shaft either to the driving or to the mass member, the other operative connection being either of a similar varying ratio type or of a type providing a constant gear ratio between the two elements connected.

The invention may be carried into practice in various ways but three alternative arrangements according to this invention are illustrated diagrammatically by way of example in the accompanying drawings, in which Figure 1 is a side elevation partly in section, Figure 2 is an end elevation of the arrangement shown in Figure 1, Figure 3 is a side elevation partly in section of an alternative arrangement, Figure 4 is an end elevation of the arrangement shown in Figure 3, Figure 5 is a side elevation partly in section of a modified form of the arrangement shown in Figure 1, and Figure 6 shows diagrammatically an alternative form of varying ratio operative connection which may be employed between the intermediate shaft and the driving member or the mass member in a variable speed gear or torque converter according to the present invention.

In the construction illustrated in Figures 1 and 2, the apparatus comprises a driving shaft A rotatably mounted in a bearing support $A^1$ and carrying rigidly secured to it an elliptical gear wheel B so arranged that the axis of the shaft A passes through one of the foci of the ellipse. Meshing with the elliptical gear wheel B is a similar elliptical gear wheel C rigidly connected to one end of a shaft $C^1$, freely mounted to rotate in a support D. The support D is capable of rotating freely about the axis of the shaft A, and constitutes the driven member of the apparatus, to which end it is conveniently provided with gear teeth $D^1$. Rigidly mounted on the other end of the shaft $C^1$ is a circular gear wheel $C^2$ meshing with a similar circular gear wheel E rigidly connected to a shaft $E^1$ which is freely mounted in a bearing support $E^2$ and carries a mass member $E^3$ in the form of a flywheel. In the construction diagrammatically illustrated the driven member D is freely supported in a rotatable manner on the ends of the shafts A and $E^1$.

In the alternative construction illustrated in Figures 3 and 4 the apparatus comprises a driving shaft F rotatably mounted in a support $F^1$ and carrying a crank arm $F^2$ provided with a crank pin $F^3$. The crank pin $F^3$ engages and is capable of sliding in a slot $G^1$ in an arm G rigidly connected to one end of a shaft $G^2$ which is mounted in a freely rotatable manner in a member H, the member H being mounted in a bearing support $H^1$ so as to be capable of rotating about an axis coincident with that of the driving shaft F and constituting the driven member of the apparatus.

Rigidly connected to the other end of the shaft $G^2$ is a second arm J similar to the arm G and angularly displaced by 180° from the arm G about the axis of the shaft $G^2$. The arm J is provided with a slot $J^1$ which is engaged by a crank pin K free to slide in the slot and carried on the end of a crank arm $K^1$ which is rigidly mounted on a shaft $K^2$. The shaft $K^2$ is free to rotate in a bearing support $K^3$ and carries a mass member $K^4$ in the form of a flywheel.

In the alternative construction illustrated in Figure 5, the apparatus is somewhat similar to that shown in Figure 1. In the construction shown in Figure 5, however, the driving shaft L which is mounted to rotate in a bearing support $L^1$ has rigidly connected to it an elliptical gear wheel $L^2$ meshing with a similar elliptical gear wheel $L^3$ rigidly mounted on one of an intermediate shaft $L^4$ which can rotate freely in a member M, the member M being capable of rotating freely about the axis of the driving shaft L and constituting the driven member of the device. Rigidly connected to the other end of the shaft $L^4$ is a second elliptical gear wheel $L^5$ meshing with a similar elliptical gear wheel N rigidly mounted on a shaft $N^1$ which is free to rotate in a bearing support $N^2$ and carries an inertia member. In this construction the effective inertia of the inertia member can be varied and to this end the inertia member comprises a sleeve O rigidly connected to the shaft $N^1$ and formed with two lugs $O^1$, and a second sleeve $O^2$ provided with lugs $O^3$ and capable of sliding axially along the shaft $N^1$. Pivoted to each of the lugs $O^1$ is a link $O^4$ the free end of which is connected by a pivot $O^5$ to the free end of a link $O^6$ pivoted to one of the lugs $O^3$, weights $O^7$ being carried by the pivots $O^5$. Disposed between the sleeves O and $O^2$ is a compression spring $O^8$. With this arrangement it will be seen that by moving the sleeve $O^2$ axially against the action of the spring $O^8$ the distance of the weights $O^7$ from the axis of rotation of the shaft and hence the effective value of the inertia member can be varied. Alternatively the sleeve $O^2$ may be free to slide along the shaft $N^1$ when the weights $O^7$ move outwards under the action of centrifugal force due to the rotation of the shaft $N^1$ so that the effective inertia of the inertia member varies automatically in accordance with the speed of the shaft $N^1$.

In the construction shown in Figure 5 each of the gear wheels $L^2$ $L^3$ $L^5$ and N is mounted upon its shaft so that such shaft passes through one of the foci of the ellipse constituted by the periphery of such gear wheel, the two gear wheels $L^3$ and $L^5$ being so angularly disposed on the shaft $L^4$ relatively to one another that when the portion of the gear wheel $L^3$ having the smallest distance from the axis of the shaft $L^4$ is in engagement with the gear wheel $L^2$ the portion of the gear wheel $L^5$ having the largest distance from the axis of the shaft $L^4$ is in engagement with the gear wheel N as shown.

Figure 6 shows an alternative form of operative connection which may be employed between the driving shaft or the mass member and the intermediate shaft of a variable speed gear or torque converter according to the present invention. In the arrangement diagrammatically shown, the driving shaft or the mass member P carries a crank arm $P^1$ which is connected by a pivot $P^2$ to one end of a link $P^3$. The other end of the link $P^3$ is connected by a pivot $P^4$ to the free end of a crank arm $P^5$ carried by the intermediate shaft $P^6$. The lengths of the crank arms $P^1$ and $P^5$ and the positions of the pivots $P^2$ and $P^4$ thereon are so determined that the distance of the pivot $P^2$ from the axis of the driving shaft or mass member P is greater than the distance between the axes of the member P and the intermediate shaft $P^6$, while the distance of the pivot $P^4$ from the axis of the intermediate shaft $P^6$ is similarly greater than the distance of the axis of the member P from the axis of the intermediate shaft $P^6$. With this arrangement it will be seen that with the axis of the intermediate shaft $P^6$ held stationary, i. e. with the driven member held stationary, and the member P rotated at constant speed, the speed of rotation of the intermediate shaft $P^6$ about its own axis will vary continuously. Thus, for example, while the pivot $P^2$ moves from position 1 to position 5, only small rotation of the arm $P^5$ and shaft $P^6$ about its axis is effected, whereas while the pivot $P^2$ moves from position 5 to position 10 a very considerably greater rotational movement of the arm $P^5$ and shaft $P^6$ takes place.

With constructions employing one or more operative connections of the type shown in Figure 6, the distance of the crank pins $P^2$ and $P^4$ respectively from the axes of the shafts P and $P^6$ may vary. In all cases, however, as stated, the distance of the axis of each crank pin from the axis of the shaft carrying it must be greater than the distance between the axes of the two shafts P, $P^6$.

The length of the link $P^3$ may also vary but in all cases must lie between certain limits which may be defined as follows:—Assuming the driven member and hence the axis of the intermediate shaft $P^6$ to be stationary, then the crank pins carried respectively by the intermediate shaft and the driving or mass member may be regarded as each describing a circle. Assuming now that a straight line be drawn passing through the centres of the two circles thus described, then this line may be regarded as a diameter of the larger circle which is intersected by the circumference of the smaller circle at two points, one of which lies nearer the centre of the larger circle than the other. The effective length of the link must lie between the lengths of the two portions of this diameter of the larger circle which lie respectively on each side of the point nearer the center of the larger circle where the circumference of the smaller circle intersects such diameter. That is to say, in the construction shown in Figure 6 the length of the link must lie between the length $a$ and the length $b$ indicated on the drawing.

In some cases intermediate gearing or other operative connections carried by the driven member D may be interposed between the mechanism for transmitting movement from the driving shaft to the intermediate member or for transmitting motion from the intermediate member to the mass member and such intermediate connections may in themselves provide for the continuously varying gear ratio necessary between the driving and mass members. In all cases, however, whether one or more intermediate shafts are provided, and whether one or more operative connections of the varying ratio type are employed, the arrangement must be such as set forth above that with the driving member rotating at a constant speed and the driven member stationary, the mass will be driven in the same sense as the driving member and at a constantly accelerating and decelerating speed, the rate of acceleration and deceleration of the mass and hence the torque on the mass member being the greater both during the accelerating and decelerating phase, the greater the difference in the speeds of the driving and driven members, while when the driven member rotates at the same speed and in the same sense as the driving member there is no acceleration or deceleration of the mass member.

It will be seen that in each of the constructions illustrated this function is achieved. Thus with any of the devices described, with the driving member rotating at a constant speed, if the driven member is rotating at the same speed and in the same sense there will be no acceleration or deceleration of the mass member and hence no torque on this member. If, however, the driven member is rotating slower than the driving member or is rotating in the opposite sense, the mass member will be subjected to oscillating torque caused by the acceleration and deceleration of the mass, and this torque will produce moments of alternating sign not only in the mass member but also in the operative connections between the intermediate shaft and the driving and mass members. Now, since the alternating torque in the mass member, whether due to acceleration or deceleration of the mass at any moment or over any period can only be decreased or finally eliminated by acceleration of the driven member in the same sense and towards the same speed as the driving member, it follows that this torque must react on the driven member in a manner tending to cause it to rotate at the same speed as and in the same sense as the driving member since the reaction on the driven member must be in a sense tending to cause movement of the driven member in a direction in which the reaction thereon will be reduced or eliminated.

Thus as long as the driven member is rotating slower than the driving member, or when it is stationary, a torque will be exerted thereon tending to rotate it in the same sense as the driving member, this torque being a function of the difference in speed between the driving and driven members. Thus, whereas in previous devices employing driving and driven member connected epicyclically in which variations in the relative speeds cause variations in the acceleration and deceleration of a mass, an accelerating rotation of the driven member would decrease the inertial torque only during either the accelerating or the decelerating phase and would increase it during the other phase so that the torque on the driven member was alternating and ratchets were required to yield a unidirectional drive, the apparatus according to the present invention yields such a unidirectional drive without the necessity for ratchets or similar one-way driving devices.

In some cases the characteristics of the gear may not be satisfactory where the effective inertia of the mass is constant. Thus, means such as those illustrated in Figure 5 may be provided for varying the effective inertia of the mass.

Further, where means are provided as indicated above for varying the characteristics of the gear by varying the effective inertia of the mass, this variation may either be effected manually or automatically, for example by a centrifugal or other governor operated in accordance with the speed of either the driving or the driven member. With such an arrangement the manner in which the characteristics of the gear are varied by the governor will depend upon the characteristics of such governor and a governor can be employed having the desired characteristics to suit the purpose for which the gear is to be employed.

Again, in some cases where mechanism is provided for varying the characteristics of the gear as indicated above, such mechanism may be interconnected with the throttle or other speed control mechanism of the internal combustion engine or other prime mover from which the driving shaft derives its power.

Such an arrangement might for example be used with advantage on motor road vehicles where it is difficult or impossible, where the vehicle is intended to operate over a wide range of speeds or where normal speeds are considerably below maximum speeds, to obtain a good performance, good acceleration and engine economy with a purely automatic gear according to this invention without means for varying the effective inertia of the mass. Thus in a motor road vehicle the throttle may be so interconnected with mechanism for varying the effective inertia of the mass that this effective inertia is at a minimum when the throttle is in its idling position and increases rapidly to a maximum for the throttle position corresponding to normal speed, after which it decreases again as the throttle is moved to its fully open position.

It is to be understood that a variable speed gear or torque converter according to this invention is not limited to one intermediate shaft and a single mass member but if desired two or more intermediate shafts may be carried by the driven member, each of such shafts being operatively connected to the driving member and to a mass member in the manner according to this invention, the mass members in such an arrangement being arranged coaxially and preferably concentrically.

Further the operative connections between each intermediate shaft and the driving and mass members may vary and other constructional details be varied within wide limits while conforming to the conditions set out above, without departing from this invention.

What I claim as my invention and desire to secure by Letters Patent is:—

1. A torque converter including in combination coaxial driving and driven members, a third member mounted to rotate coaxially with the driving and driven members, a mass carried by the third member, an intermediate shaft rotatably carried by the driven member and lying parallel to but out of line with the driving and driven members, and operative connections between the intermediate shaft and the driving member and between the intermediate shaft and the third member such that with the driven member stationary and the driving member rotating at a constant speed, the third member will rotate always in the same sense as the driving member but at a varying speed, whereas with the driving member rotating at a constant speed the greater the difference between the speeds of the driving and driven members during both the acceleration and deceleration of the third member, the greater the rate of acceleration or deceleration of the third member and the greater the torque produced on the third member due to the inertia of the mass, there being no acceleration or deceleration of the third member and hence no torque on the mass when the driven member rotates at the same speed and in the same sense as the driving member.

2. A torque converter including in combination coaxial driving and driven members, a third member mounted to rotate coaxially with the driving and driven members, a mass, an operative connection between the third member and the mass, an intermediate shaft rotatably carried by the driven member and lying out of line with the driving and driven members, and operative connections between the intermediate shaft and the driving member and between the intermediate shaft and the mass member at least one of which is of a nature providing a continually varying gear ratio as between the two members it connects.

3. A torque converter including in combination coaxial driving and driven members, a third member mounted to rotate coaxially with the driving and driven members, a mass, an operative connection between the third member and the mass, an intermediate shaft rotatably carried by the driven member and lying parallel to but out of line with the driving and driven members, and operative connections between the intermediate shaft and the driving member and between the intermediate shaft and the mass member, at least one of which is of a nature providing a continually varying gear ratio as between the two members it connects.

4. A torque converter including in combination coaxial driving and driven members, a third member mounted to rotate coaxially with the driving and driven members, a mass mounted on the third member, an intermediate shaft rotatably carried by the driven member and lying parallel to but out of line with the driving and driven members, and operative connections between the intermediate shaft and the driving member and between the intermediate shaft and the third member, at least one of which is of a nature providing a continually varying gear ratio as between the two members it connects.

5. A torque converter including in combination coaxial driving and driven members, a third member mounted to rotate coaxially with the driving and driven members, a mass, an operative connection between the third member and the mass, an intermediate shaft rotatably carried by the driven member and lying parallel to but out of line with the driving and driven members, and operative connections between the intermediate shaft and the driving member and between the intermediate shaft and the third member, at least one of which comprises two intermeshing elliptical gear wheels similarly eccentrically mounted on the two members to be connected.

6. A torque converter including in combination coaxial driving and driven members, a third member mounted to rotate coaxially with the driving and driven members, a mass, an operative connection between the third member and the mass, an intermediate shaft rotatably carried by the driven member and lying parallel to but out of line with the driving and driven members, and operative connections between the intermediate shaft and the driving member and between the intermediate shaft and the third member, at least one of which comprises a link, pivots connecting the ends of the link respectively to the intermediate shaft and one of the said members, each of said pivots lying at a greater distance from the axis of rotation of the member carrying it than the distance between the axes of the driving member and the intermediate shaft.

7. A torque converter including in combination coaxial driving and driven members, a third member mounted to rotate coaxially with the driving and driven members, a mass, an operative connection between the third member and the mass, an intermediate shaft rotatably carried by the driven member and lying parallel to but out of line with the driving and driven members, and operative connections between the intermediate shaft and the driving member and between the intermediate shaft and the third member, at least one of which comprises an arm on one of the said members having a longitudinal slot therein, a crank on the intermediate shaft, and a crank pin on the crank which engages but is capable of sliding in the slot in the arm.

In testimony whereof I have signed my name to this specification.

CHRISTOPHER ST. JOHN SPRIGG.